United States Patent [19]

Shaffer et al.

[11] Patent Number: 5,403,803
[45] Date of Patent: Apr. 4, 1995

[54] CARBOCATIONIC CATALYST AND PROCESS FOR ITS USE

[75] Inventors: Timothy D. Shaffer, Dickinson; John R. Ashbaugh, Houston, both of Tex.

[73] Assignee: Exxon Chemical Patents Inc., Linden, N.J.

[21] Appl. No.: 128,449

[22] Filed: Sep. 28, 1993

[51] Int. Cl.$^6$ .............................................. B01J 31/00
[52] U.S. Cl. ................... 502/111; 502/103; 502/123; 502/124; 502/125; 502/127; 502/128; 502/152; 502/154
[58] Field of Search ............... 502/103, 111, 123, 124, 502/125, 127, 128, 152, 154

[56] References Cited

U.S. PATENT DOCUMENTS

| | | | |
|---|---|---|---|
| 4,929,683 | 5/1990 | Kennedy et al. | 525/268 |
| 4,946,899 | 8/1990 | Kennedy et al. | 525/244 |
| 5,276,094 | 1/1994 | Kaszas et al. | 525/95 |

FOREIGN PATENT DOCUMENTS 1272547  8/1990  Canada.

*Primary Examiner*—Helen M. S. Sneed
*Assistant Examiner*—E. D. Irzinski
*Attorney, Agent, or Firm*—Catherine L. Bell

[57] ABSTRACT

In accordance with this invention, there is provided a living carbocationic polymerization catalyst system comprising: (1) a halide of titanium, tin, vanadium or antimony; (2) an aluminum halide selected from the group consisting of aralkyl aluminum halides and alkyl aluminum halides; and (3) an initiator selected from the group consisting of tertiary alkyl halides, tertiary aralkyl halides, tertiary polymeric halides, and water provided that if the initiator is organic, a proton scavenger is present, or, alternatively, if the initiator consists of water, a secondary or tertiary amine is present. Another aspect of the invention comprises a process for using this catalyst system for the polymerization of olefins and for producing narrow molecular weight distribution polymers in a short reaction time.

31 Claims, No Drawings

CARBOCATIONIC CATALYST AND PROCESS FOR ITS USE

FIELD OF THE INVENTION

This invention relates to the living polymerization of olefins using a catalyst system comprising titanium, tin, vanadium, or antimony halides and alkyl aluminum halides.

BACKGROUND OF THE INVENTION

Living and non-living catalysts have been used to polymerize olefins. In living polymerization, each catalyst molecule initiates a growing polymer chain that does not undergo chain transfer or termination reactions while monomer is present. One can determine whether or not living polymerization has occurred by comparing the number of initiator molecules with the number of polymer chains produced in the final polymer. These two numbers should be equivalent for true living polymerization. If there are a substantially greater number of polymer chains as compared to initiator molecules, then the polymerization is not living.

The basic components of known living polymerization systems include a Lewis acid, a tertiary alkyl initiator molecule containing a halogen, ester, ether acid, or alcohol group, and an electron donor molecule such as ethyl acetate.

Lewis acids of known living polymerization systems include titanium tetrachloride (TiCl$_4$), boron trichloride (BCL$_3$), tin tetrachloride (SnCl$_4$), iron trichloride (FeCl$_3$), aluminum trichloride (AlCl$_3$) and the like. These compounds have been described in U.S. Pat. Nos. 4,910,321 and 4,929,683 and European patent application 341,012 for use in living polymerization of olefins. The exact combination of these elements, however, varies with each system. The tertiary alkyl initiators typically used in living polymerization systems are represented by the formula:

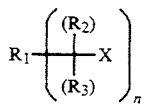

wherein R$_1$, R$_2$ and R$_3$ are a variety of alkyl or aromatic groups or combinations thereof, n is the number of initiator molecules, and X is the functional group upon which the Lewis acid affects a change to bring about the carbocationic initiating site. The functional group is typically a halogen, ester, ether, alcohol, or acid group depending on the Lewis acid employed.

As discussed in U.S. Pat. No. 5,169,914, the chosen electron pair donor component of the above systems is believed to directly relate to the ability of these catalysts to stabilize the carbocation formed and to generate living conditions. The electron donor number concept has been used to explain the activity of catalyst systems which employ ether and ester initiators. It is believed that the formation of in situ electron pair donors are responsible for the catalyst characteristics. However, the role of the electron donor is still uncertain and has been challenged. See, M. Gyor, L. Balogh, H. C. Wang, R. Faust, Polym. Prepr. Amer. Chem. Soc., 33(1), 158 (1992).

Such living polymerization systems are useful for production of narrow molecular weight distribution polymers, however, these systems are very sensitive to certain impurities. For example, the presence of water in Lewis acid catalyzed systems has been considered detrimental because water is associated with chain transfer dominated, nonliving polymerization which results in broad molecular weight distribution polymers i.e., polymer with an Mw/Mn greater than 2.0. There is a decrease in desirable physical properties when the polymer has a broad molecular weight distribution. Recently we have found that water can be used to initiate the living polymerization of isobutylene provided that the correct Lewis acid to water ratio is used. Additionally, in co-pending U.S. application Ser. No. 08/044,862 the addition of an amine to this process was found to modify the overall amount of Lewis acid required to bring about living conditions.

Catalyst systems based on BCl$_3$ and TiCl$_4$ using a number of combinations of the previously described components have very similar process characteristics. First, the Lewis acid concentrations must exceed the concentration of initiator sites by 16 to 40 times in order to achieve 100 percent conversion in 30 minutes (based upon a degree of polymerization equal to 890) at $-75°$ to $-804°$ C. Much longer polymerization times are required for higher polymerization temperatures. These catalyst systems are also typically used with solvents such as methyl chloride.

For an industrially applicable process, these catalysts and polymerization conditions fall short of commercial usefulness. Improvements in these systems would include reduction in polymerization time while maintaining narrow molecular weight distribution.

SUMMARY OF THE INVENTION

In accordance with this invention, there is provided a living carbocationic polymerization catalyst system comprising: (1) a halide selected from the group consisting of titanium, tin, vanadium and antimony; (2) an aluminum halide selected from the group consisting of aryl aluminum halides, aralkyl aluminum halides, and alkyl aluminum halides; (3) an initiator selected from the group consisting of tertiary alkyl halides, tertiary aralkyl halides, tertiary polymeric halides and water; and (4) a proton scavenger if the initiator is organic or, alternatively, a secondary or tertiary amine if the initiator is water; and (5) if the aluminum halide is a dihalide, a stabilizer. Another aspect of the invention comprises a process for using this catalyst system for the polymerization of olefins and for producing narrow molecular weight distribution polymers in a short reaction time.

DESCRIPTION OF PREFERRED EMBODIMENTS

In a preferred embodiment, this invention relates to a living carbocationic polymerization catalyst system and process based upon a catalyst composition comprising:
(1) a halide selected from the group consisting of titanium, tin, vanadium, and antimony;
(2) an aluminum halide selected from the group consisting of aryl aluminum halides, aralkyl aluminum halides, and alkyl aluminum halides;
(3) an initiator selected from the group consisting of tertiary alkyl halides, tertiary aralkyl halides, tertiary polymeric halides, and water provided that if the initiator selected is organic, a proton scavenger is present, or, alternatively, if the initiator consists of water, a secondary or tertiary amine is present; and (4) stabilizer, if the aluminum halide is a dihalide.

This catalyst system can be used, among other things, for the polymerization of olefins, including cyclic, linear, or branched olefins and diolefins. Preferred olefins include isoolefins, alpha-olefins, and styrenics.

Preferred styrenes include alkyl, alkoxy or halogenated styrenes, particularly para-methyl styrene, alpha-methyl styrene, para chlorostyrene and the like. This system has the benefit of producing polymers with narrow molecular weight distribution within a short time period.

Preferred isoolefins include any $C_4$ to $C_{30}$ isoolefin, particularly isobutene, isohexene, isooctene and the like. Preferred alpha-olefins include any $C_2$ to $C_{30}$ alpha-olefin, particularly ethylene, propylene, butene, pentene, hexene, heptene, octene, and the like.

Preferred halides include any halide of titanium, tin, vanadium or antimony, preferably chloride, fluoride or bromide, even more preferably chloride. Titanium (IV) halides are preferred, particularly titanium (IV) chlorides, with titanium tetrachloride being especially preferred. Particularly preferred embodiments include titanium tetrabromide, tin (IV) chloride, tin (IV) bromide, antimony hexachloride, antimony hexafluoride, vanadium tetrachloride, and vanadium tetrabromide.

Preferred aluminum halides include dialkyl aluminum halides and monoalkyl aluminum halides. Preferred alkyls may be linear, branched or cyclic and may contain up to 30 carbon atoms with 1-4 carbon atoms most preferred.

Preferred aluminum halides are represented by the formula:

$$R_nAlX_{3-n}$$

where R is a $C_1$ to $C_{15}$ linear, cyclic or branched chain alkyl, aryl, aralkyl, or alicyclic group and n=1 or 2. X is a halogen. When n is equal to 2, the two R groups can be the same or different $C_1$ to $C_{15}$ groups, preferably the same linear group, most preferably ethyl, but R may also be the same or different cyclic or branched chain alkyl, aryl, aralkyl, or alicyclic group. For the purposes of this invention and any claims thereto, aralkyl is defined to mean a compound containing both aryl and aliphatic structures. X may be the same or different halogen but is preferably chloride. The preferred aluminum halides are diethylaluminum chloride, ethyl aluminum dichloride, methyl aluminum dichloride, isobutyl aluminum dichloride, and dimethyl aluminum chloride, or a combination thereof. Brominated versions of the above are also preferred.

The polymerization may take place in solution or bulk phase, preferably solution. If in solution, the solvent may be polar, nonpolar or a mixture thereof but is preferably more nonpolar than polar.

The solvent medium may be a mixture of two or more solvents. Non-polar/non-polar, polar/polar and non-polar/polar mixtures and the like are all suitable for this invention. The preferred mixture is nonpolar/polar. Suitable solvents include hydrocarbons; especially hexanes, heptanes and toluene; halogenated hydrocarbons; especially chlorinated hydrocarbons, and nitro alkanes. Specific examples include, but are not limited to, methylcyclohexane, ethylcyclohexane, propylcyclohexane, methylchloride, methylenechloride, ethylchloride, propylchloride, butylchloride, chloroform, nitroethane, nitromethane, and the like.

A preferred solvent is a mixture of methylcyclohexane (MCH) and methylenechloride (MeCl2) at about 30 to about 80 parts by volume MCH to 70 to 20 parts MeCl2. More preferably, the solvent will contain a mixture of 40 to about 70 parts methylcyclohexane and about 60 to about 30 parts methylenechloride. A most preferred solvent medium is about 60 parts methylcyclohexane and about 40 parts methylenechloride. Mixtures of other similar polar and nonpolar solvents may be used provided the dielectric constant of the mixture approximates that of the MCH/MeCl2 mixtures described above. Preferred polar solvents include, but are not limited to, methyl chloride, ethyl chloride, methylene chloride, and 1,2-dichloroethane. Preferred nonpolar solvents include, but are not limited to, hexane, heptane, methylcyclohexane, cyclohexane, ethylcyclohexane, and the like.

The initiator may be any one of a tertiary alkyl halide, a tertiary aralkyl halide, a tertiary polymeric halide, or water. Preferred organic initiators are represented by the formula:

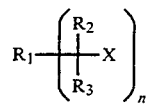

where $R_1$, $R_2$ and $R_3$ are independently any straight or branched chain alkyl, aryl or aralkyl, preferably containing 1 to 15 carbon atoms, preferably 1-8 carbon atoms, most preferably 1 to 2 carbon atoms. X is any halogen or pseudohalogen, preferably chloride. "n" is the number of initiator sites and is a number greater than or equal to 1, preferably 1-6. Preferred aralkyls may be substituted or unsubstituted. Preferred initiators include 2-chloro-2,4,4-trimethyl pentane (TMPCl) and 1,3,5 tri (1-chloro-1-methyl ethyl) benzene (TBDCC). Other suitable initiators can be found in U.S. Pat. No. 4,946,899, which is herein incorporated by reference.

For the purposes of this invention and the claims thereto psuedohalogen is defined to be any compound that is an azide, an isocyanate, a thiocyanate, an isothiocyanate or a cyanide.

When the initiator is a tertiary polymeric halide, one of $R_1$, $R_2$ or $R_3$ is an olefin polymer, the remaining R groups are defined as above, and n is a number between 1 and 1000, preferably between 1 and 500, even more preferably between 1 and 50. Preferred olefin polymers include polyisobutlyene and polypropylene. The polymeric initiator may have halogenated tertiary carbon positioned at the chain end or along or within the backbone of the polymer. When the olefin polymer has multiple halogen atoms at tertiary carbons, either pendant to or within the polymer backbone, the product polymer may have a comb like structure and/or side chain branching depending on the number and placement of the halogen atoms in the olefin polymer. Likewise, the use of a chain end tertiary polymer halide initiator provides a method for producing block copolymers. Monomer added to the polymeric initiator will form a second block. Successive blocks can be formed by sequential monomer addition.

The initiator, whether organic or $H_2O$, may be present at a concentration of about $1 \times 10^{-6}$ moles per liter to about 3 moles per liter, preferably about $1 \times 10^{-1}$ moles per liter to about $1 \times 10^{-5}$ moles per liter, even more preferably about $1 \times 10^{-2}$ moles per liter to about $1 \times 10^{-4}$ moles per liter.

When an organic initiator is used, a proton scavenger is preferably used to, inter alia, minimize the water initiation. Where the initiator is water, a secondary or tertiary amine may be used to modify the concentration of $H_2O$ and thereby affect molecular weight and molecular weight distribution of the product polymer.

For the purposes of this invention and the claims thereto, a proton scavenger is defined to be a composition capable of reacting with free protons without producing a new species of catalyst, or, if it does produce a new species of catalyst, that catalyst is substantially inactive when compared to the catalyst system of this invention. Preferred proton scavengers are 2,6-di-tert-butyl-pyridine (DTBP), 4 methyl-2,6-di-tert-butyl-pyridine and 1,8-bis(di-methylamino)napthalene used alone or in combination.

When only organic initiation is desired, the amount of proton scavenger used should be equal to or greater than the concentration of water in the polymerization system.

In addition, stabilizer may be added to the above system to aid in control of narrow molecular weight distribution. For purposes of this invention, stabilizers are defined as molecules capable of coordinating to the aluminum halide forming a 1:1 complex. These molecules usually contain heteroatoms and heteroatomic functional groups including amides, esters, ethers, sulfoxides and the like. While not wishing to be bound by any particular theory, it is believed that this control is achieved through stabilization of the inorganic intermediate formed when the titanium, tin, vanadium or antimony halide reacts with the aluminum halide. The stabilizer is optional, but preferred, if the aluminum halide is a monohalide; when the aluminum halide is a dihalide, a stabilizer is highly preferred. A number of different compounds may serve as the stabilizer including esters, amines, amides, ketones and linear, branched or cyclic allyl, alkyl, phenyl, and benzyl compounds. Preferred stabilizers include allyl butylrate, ethyl acetate, triethylamine, trimethylamine, benzyl acetate, and the like.

The water present as an initiator in the polymerization or catalyst system as described above is typically residual water found in solvents and the like, in spite of drying procedures used in the art. As a general rule, a proton scavenger is used with organic initiator and any secondary or tertiary amine is used with the water, even though all currently known proton scavengers are amines, but not all amines are proton scavengers.

When water serves as the initiator, an optional third component of the catalyst system is a secondary or tertiary amine. The amine can be any secondary or tertiary amine but is preferably represented by the following formula:

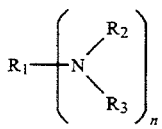

Wherein $R_1$, $R_2$, and $R_3$ are each independently hydrogen or a straight, cyclic, or branched chain alkyl, aryl or aralkyl, preferably containing 1 to 15 carbon atoms, more preferably 1 to 8 carbon atoms, most preferably 1 to 4 carbon atoms, provided that only one of $R_1$, $R_2$ or $R_3$ should be H at any one time and that $R_2$ and $R_3$ may be joined in a cyclic structure. The aralkyls can be substituted or unsubstituted.

Preferred examples of amines include, diisopropylamine, triethylamine, tributylamine, diiosbutylamine, diethylamine, 2,6-di-tertbutylpyridine and the like. The amine is typically present at a concentration that is less than the total water concentration in the system. The titanium, tin, vanadium or antimony halide molar concentration to water molar concentration ratio when water is used as an initiator should be at least about 125 without an optional amine present, preferably about 150 to about 300 or more, or if an optional amine is present then the ratio of aluminum halide molar concentration to water molar concentration is preferably at least about 50, even more preferably about 65 to about 300.

Generally, water, whether added or not, will be present in the system. The concentration of the water in the system producing polymer with a $M_w/M_n$ of 1.5 is calculated by solving for I in the following equation $[M]/[I]=DP$, where M equals monomer, I equals initiator and DP equals the degree of polymerization for a water initiated polymerization, degree of polymerization is calculated by dividing the number average molecular weight of the polymer by the weight average molecular weight of the monomer(s). (For example, 0.268 mol/l of $TiCl_4$ and 2.8 mol/l of isobutylene in a 60/40 mix of methylcyclohexane/methylene chloride at $-75$ degrees C. for 21 minutes yielding 89% polymer with a Mn of 69,100 and an Mw/Mn of 1.32 means DP=1232 and the water concentration =2.8/DP; therefore $[I]=2.3 \times 10^{-3}$ mol/l). This value is calculated for a batch of dried solvent or solvent mixture and then the value is used when that solvent is the reaction media. For purposes of this invention, it is assumed that the concentration of water in a given system of the same solvent batch does not vary in a statistically significant manner. Even though the exact concentration may vary, the concentration is usually between $10^{-3}$ a to $10^{-4}M$. For purposes of this invention, it is assumed that the water is free or available to act with the aluminum halide.

The halide of Ti, Sn, V, or Sb may be at a concentration of from about $10^{-1}$ mole/l to about $10^{-6}$ mole/l, preferably from about $10^{-2}$ mole/l to about $10^{-5}$ mole/l, and more preferably from about $10^{-2}$ mole/l to about $10^{-4}$ mole/l. The concentration of Ti, Sn, V, or Sb halide is typically determined from the initiator concentration where the molar ratio of Ti, Sn, V or Sb to initiator molar concentration is one or greater, preferably from about 1 to about 64, more preferably from about 4 to about 32, most preferably from about 4 to about 8.

When organic initiators are used, the halide may be present at a ratio of the Ti, Sn, or Sb halide molar concentration to the initiator molar concentration of about 4 or greater, preferably about 4 to about 32, even more preferably about 4 to about 8. Likewise, the molar ratio of Ti, Sn, or Sb halide to aluminum halide acid may be about 1 or greater, preferably about 1 to about 30, even more preferably about 3 to about 6.

The concentration of aluminum halide is preferably less than the Ti, Sn, V, or Sb halide concentration. In preferred embodiments, the mole ratio of Ti, Sn, V, or Sb to aluminum halide may be one or greater, preferably from about 1 to about 30, more preferably from about 3 to about 6. In the practice of this invention, it is highly preferred to start the polymerization by separately adding the aluminum halide after the halide of Ti, Sn, V, or Sb is introduced. For example, the titanium, tin, vanadium or antimony halide is added to the solvent, monomer and proton scavengers, and amines. Then the aluminum halide or aluminum halide/stabilizer complex is added. The aluminum halide complex may or may not be prepared before addition to the vessel, but prior preparation of the aluminum halide/stabilizer complex is preferred.

The polymerizations of this invention are conducted under conditions known to those of ordinary skill in the art. Polymerization is typically performed in a solution phase reactor by methods known in art. Preferred conditions include polymerization reactions run at or below about −5° C., preferably at or below about −30° C., more preferably at or below about −70° C. in a reactor suitable to maintain temperature conditions. Monomers which may be polymerized by this system include one more of olefins, alpha-olefins, disubstitued olefins and/or isolefins. Preferably, the monomer contains 1 to 20 carbon atoms, more preferably 1 to 8, even more preferably 2 to 6 carbon atoms. Examples of preferred olefins include isobutylene, 2-methylbutene, 2-methylpentene and the like.

The polymerization is typically complete in about ten minutes, however the polymerization may run from less than one minute to about an hour. However, longer times are still within the scope of this invention. The polymerization may also take place in any reaction vessel, including glass, pressure reactors, solution reactors, and the like.

The polymers produced by this invention have a narrow molecular weight distribution (Mw/Mn) of less than about 2.5, preferably less than about 2.0, even more preferably less than about 1.5. Polyisobutylene and other isobutylene based polymers having a narrow molecular weight distribution are the preferred polymer products produced by this catalyst system.

EXAMPLES

For the examples of this invention, the method described above was used to calculate the concentration of water in the solvents.

Molecular weights (Mw and Mn) were measured by gel permeation chromatography using a Waters 150 gel permeation chromatograph equipped with a differential refractive index (DRI) detector. The numerical analyses were performed using a commercially available standard of gel permeation chromatography software package.

Procedure

Except where noted, polymerization conditions were generally the same as those disclosed in U.S. Pat. No. 4,910,321 (Kennedy et al.), incorporated herein. As a representative example; in a nitrogen box with a water content of approximately 5 parts per million, a resin kettle was charged with 11 microliters of TMPCl, 13.2 ml anhydrous methylene chloride, 19.8 ml of anhydrous methylcyclohexane and 80 microliters of DTBP. The solution was cooled to −75° C., whereupon 5 ml of isobutylene was added. Once the solution stabilized at this temperature, 0.16 ml of a 2.5M solution of titanium tetrachloride was added to begin the polymerization. After 1 minute, 0.125 ml of a 2.5M solution of diethylaluminum chloride was added to the reaction. The reaction was stopped after 5 minutes with the addition of 3 ml of chilled methanol. Polymer was isolated by pouring the reaction mixture into methanol with stirring.

When water is used as the initiator, the same procedure is followed as above, except that the organic initiator is excluded and that an amine or proton trap may or may not be added before the addition of the aluminum halides to the reaction.

EXAMPLES

Table 1

Isobutylene polymerizations in Table 1 were initiated from tertiary alkyl halides and coinitiated with titanium tetrachloride and alkyl aluminum chloride in 60/40 v/v methylcyclohexane/methylene chloride at −75° C. The initiator for the reactions shown in Table 1, except where noted, was 5-tert-butyl-1,3-bis(1-chloro-1-methylethyl) benzene. Reactions 1, 2, 15, 16, and 19 were run in the presence of alkyl butyrate ([AB] $9.0 \times 10^{-3}$ mole/l). In reactions 5 and 6, monomer was added 4 minutes after both acids had been added. Reactions 11 and 12 were run in the presence of ethyl acetate ([EtOAC]=$9.0 \times 10^{-3}$ mole/l). Reactions 13 and 14 were run in the presence of tri-isobutyl amine ([TAB]=$9.0 \times 10^{-3}$ mole/l).

Reaction 8 shows that EADC coinitiation alone is incapable of delivering narrow MWD polymers even though yield is high. Reactions 3 and 4 show that, DEAC together with TiCl4 results in greatly accelerated polymerization. In five minutes or less, complete conversion is accomplished with only a slight increase in MWD.

TABLE 1

| Rxn. | T (°C.) | [M] | [I] | [PT] | [TiCl4] | Et$_n$AlX$_{n-3}$ n = | [R$_x$AlCl] | time (min.) | % Yield | M$_n$ | M$_w$/M$_n$ |
|---|---|---|---|---|---|---|---|---|---|---|---|
| 1 | −75 | 1.9 | $1.9 \times 10^{-3}$ | $2.8 \times 10^{-2}$ | $4.5 \times 10^{-2}$ | 1 | $9.47 \times 10^{-3}$ | 30 | 80 | 60,400 | 1.23 |
| 2 | −75 | 1.9 | " | " | " | 2 | " | " | 53 | 47,500 | 1.26 |
| 3 | −75 | 1.9 | " | " | " | 2 | " | " | 100 | 63,900 | 1.32 |
| 4 | −75 | 1.9 | " | " | " | 2 | " | 5 | 100 | 59,800 | 1.36 |
| 5 | −75 | 1.9 | " | " | " | 2 | " | 30 | 25 | 95,800 | 2.17 |
| 6 | −75 | 1.9 | " | " | " | 1 | " | 30 | 95 | 148,700 | 2.52 |
| 7 | −75 | 1.9 | " | " | " | 2 | $1.89 \times 10^{-2}$ | 20 | 100 | 59,000 | 1.63 |
| 8 | −75 | 1.9 | " | " | — | 1 | $3.6 \times 10^{-3}$ | 30 | 86 | 15,000 | 5.31 |
| 9 | −75 | 1.9 | " | " | — | 2 | $1.1 \times 10^{-2}$ | 30 | 0 | — | — |
| 10 | −75 | 1.0 | " | $2.8 \times 10^{-2}$ | $4.5 \times 10^{-2}$ | — | — | 30 | 100 | 62,200 | 1.10 |
| 11 | −75 | 1.9 | " | " | " | 1 | $9.47 \times 10^{-3}$ | 5 | 85 | 58,800 | 1.35 |
| 12 | −75 | 1.9 | " | " | " | 2 | " | 5 | 26 | 18,600 | 1.34 |
| 13 | −75 | 1.9 | " | " | " | 1 | " | 5 | 31 | 16,900 | 1.65 |
| 14 | −75 | 1.9 | " | " | " | 2 | " | 5 | 24 | 21,700 | 2.0 |
| 15 | −75 | 1.9 | — | " | " | 1 | " | 5 | 0 | — | — |
| 16 | −75 | 1.9 | — | " | " | 2 | " | 5 | 0 | — | — |
| 17 | −75 | 1.9 | — | " | " | 1 | " | 5 | 40 | ND | ND |
| 18 | −75 | 1.9 | — | " | " | 2 | " | 5 | 0 | — | — |

TABLE 1-continued

| Rxn. | T (°C.) | [M] | [I] | [PT] | [TiCl$_4$] | Et$_n$AlX$_{n-3}$ n = | [R$_x$AlCl] | time (min.) | % Yield | M$_n$ | M$_w$/M$_n$ |
|---|---|---|---|---|---|---|---|---|---|---|---|
| 19 | −75 | 1.9 | $1.3 \times 10^{-2}$ | " | " | 1 | $9.47 \times 10^{-3}$ | 5 | 32 | 1580 | 1.37 |

As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A living catalyst system comprising:
   (a) a halide selected from the group consisting of titanium halides, tin halides, vanadium halides, and antimony halides;
   (b) an aluminum halide selected from the group consisting of aryl aluminum halides, aralkyl aluminum halides, and alkyl aluminum halides;
   (c) an initiator selected from the group consisting of tertiary alkyl halides, tertiary aralkyl halides, and water,
   provided that if the initiator is organic, a proton scavenger is present or, alternatively, if the initiator consists of water, a secondary or tertiary amine is present, and further provided that if the aluminum halide is a dihalide, a stabilizer is present.

2. The catalyst system of claim 1 wherein the halide of component (a) or (b) is a chloride.

3. The catalyst system of claim 1, wherein the halide of component (a) is titanium tetrachloride.

4. The catalyst system of claim 1 wherein the aluminum halide is a dialkyl aluminum halide, a monoalkyl aluminum halide, or a mixture thereof.

5. The catalyst system of claim 1 wherein the aluminum halide is represented by the formula:

$$R_nAlX_{3-n}$$

where n is equal to 1 or 2, R is either the same or different C$_1$ to C$_{15}$ linear, cyclic or branched chain alkyl, aryl or aralkyl or aliphatic cyclic group, and X is the same or different halogen.

6. The catalyst system of claim 5 wherein n is 2, and R is the same C$_1$ to C$_{15}$ linear, cyclic or branched chain alkyl, aryl or aralkyl or aliphatic cyclic group.

7. The catalyst system of claim 5 wherein X is chloride.

8. The catalyst system of claim 1 wherein the aluminum halide is diethylaluminum chloride, ethyl aluminum dichloride or a combination thereof.

9. The catalyst system of claim 1 further comprising a solvent that is polar, non polar or a mixture thereof.

10. The catalyst system of claim 1 wherein the aluminum halide is a dihalide and the stabilizer is selected from the group consisting of esters, amines, amides, ketones, and linear, branched or cyclic allyl, alkyl, phenyl, and benzyl compounds.

11. The catalyst system of claim 10 wherein the stabilizer is allyl butyrate, ethylacetate, benzylacetate or triethylamine.

12. The catalyst system of claim 1 wherein the initiator is represented by the formula:

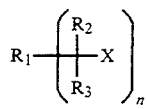

where R$_1$, R$_2$ and R$_3$ are independently C$_1$ to C$_{15}$ linear, branched or cyclic alkyl, aralkyl or substituted aralkyl groups, X is a halogen and n is the number of initiator sites; a number from 1 to 6.

13. The catalyst system of claim 12 wherein R$_1$, R$_2$, and R$_3$ are independently C$_1$ to C$_8$ linear, branched or cyclic alkyl, aralkyl or substituted aralkyl groups.

14. The catalyst system of claim 12 wherein the halogen is chlorine.

15. The catalyst system of claim 1 wherein the initiator is represented by the formula:

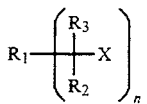

wherein R$_1$, R$_2$ and R$_3$ are independently C$_1$ to C$_{15}$ linear, branched or cyclic alkyl, aralkyl or substituted aralkyl groups, X is an azide, and isocyanate, a thiocyanate, and isothiocyanate, or a cyanide and n is a number from 1 to 6.

16. The catalyst system of claim 1 wherein the initiator is present at a concentration of about $1 \times 10^{-6}$ moles per liter to about 3 moles per liter.

17. The catalyst system of claim 1 wherein the initiator is present at a concentration of about $1 \times 10^{-1}$ moles per liter to about $1 \times 10^{-5}$ moles per liter.

18. The catalyst system of claim 1 wherein the initiator is water present at a concentration of about $1 \times 10^{-2}$ moles per liter to about $1 \times 10^{-4}$ moles per liter.

19. The catalyst system of claim i wherein the initiator is 2-chloro-2,4,4-trimethyl pentane.

20. The catalyst system of claim 1 wherein the initiator is 5-tert-butyl-1,3-di(1-chloro-1-methyl ethyl)benzene.

21. The catalyst system of claim 1 wherein the initiator is organic and the proton scavenger is one of 2,6-di-tert-butyl pyridine, 4-methyl-2,6-di-tert-butyl-pyridine, 1,8-bis(dimethyl amino)-napthalene, or diisopropyl ethyl amine, or a mixture thereof.

22. The catalyst system of claim 1 wherein the ratio of the molar concentration of component (a) to the molar concentration of component (c) is about 4 or greater.

23. The catalyst system of claim 1 wherein the ratio of the molar concentration of component (a) to the molar concentration of component (c) is about 4 to about 32.

24. The catalyst system of claim 1 wherein the ratio of the molar concentration of component (a) to the molar concentration of component (c) is about 4 to about 8.

25. The catalyst system of claim 1 wherein the ratio of the molar concentration of component (a) to the molar concentration of component (b) is about 1 or greater.

26. The catalyst system of claim 1 wherein the ratio of the molar concentration of component (a) to the molar concentration of component (b) is about 1 to about 30.

27. The catalyst system of claim 1 wherein the ratio of the molar concentration of component (a) to the molar concentration of component (b) is about 3 to about 6.

28. The catalyst system of claim 10 wherein the stabilizer is present at about a 1:1 ratio with the aluminum dihalide.

29. The catalyst system of claim 1 wherein the initiator is organic and the proton scavenger is present at a concentration greater than or equal to the concentration of water.

30. A catalyst system comprising:
(a) a chloride of titanium or tin present at a molar concentration to initiator molar concentration of about 4 to about 8;
(b) an aluminum halide present at ratio of titanium or tin chloride molar concentration to aluminum halide molar concentration of from about 3 to about 6, said aluminum halide selected from the group consisting of diethylaluminum chloride, ethylaluminum chloride, ethyl aluminum dichloride, and combinations thereof, and further provided that if the aluminum halide is ethyl aluminum dichloride, a stabilizer selected from the group consisting of allyl butylrate, ethyl acetate, triethylamine, trimethylamine and benzyl acetate is present;
(c) an initiator present at a concentration of from about $1 \times 10^{-2}$ moles per liter to about $1 \times 10^{-4}$ moles per liter and selected from the group consisting of 2-chloro-2,4,4,trimethylpentane and 5-tert-butyl-1,3-di(1-chloro-1-methylethyl)benzene; and
(d) a proton scavenger present at a concentration equal to or greater than the concentration of water in the system; said proton scavenger selected from the group consisting of 2,6-di-tert-butyl-pyridine, 4 methyl-2,6-di-tert-butyl-pyridine, 1,8-bis(dimethylamino)-napthalene, and combinations thereof.

31. A catalyst system comprising:
(a) a halide selected from the group consisting of titanium-halides, tin-halides, vanadium-halides, and antimony-halides;
(b) an aluminum halide selected from the group consisting of aryl aluminum halides, aralkyl aluminum halides, and alkyl aluminum halides;
(c) an initiator comprising a tertiary polymeric halide.

* * * * *